United States Patent
Durvasula et al.

(10) Patent No.: US 11,003,191 B2
(45) Date of Patent: ***May 11, 2021

(54) POOL CLEANING SYSTEM AND METHOD TO AUTOMATICALLY CLEAN SURFACES OF A POOL USING IMAGES FROM A CAMERA

(71) Applicant: ZODIAC POOL SYSTEMS LLC, Carlsbad, CA (US)

(72) Inventors: Kameshwar Durvasula, Garfield, NJ (US); William Londono Correa, Bloomfield, NJ (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,750

(22) Filed: Jul. 2, 2020

(65) Prior Publication Data

US 2020/0333797 A1 Oct. 22, 2020

Related U.S. Application Data

(63) Continuation of application No. 16/416,840, filed on May 20, 2019, now Pat. No. 10,739,785, which is a
(Continued)

(51) Int. Cl.
*G05D 1/02* (2020.01)
*H04N 7/18* (2006.01)
(Continued)

(52) U.S. Cl.
CPC ......... *G05D 1/0246* (2013.01); *E04H 4/1654* (2013.01); *G05D 1/0016* (2013.01);
(Continued)

(58) Field of Classification Search
CPC .. G05D 1/0246; G05D 1/0016; G05D 1/0033; G05D 1/0038; G05D 2201/0203;
(Continued)

(56) References Cited

U.S. PATENT DOCUMENTS

| | | | |
|---|---|---|---|
| 5,205,174 | A | 4/1993 | Silverman et al. |
| 5,435,031 | A | 7/1995 | Minami et al. |

(Continued)

FOREIGN PATENT DOCUMENTS

| | | |
|---|---|---|
| CN | 101139007 | 3/2008 |
| EP | 0687964 | 12/1995 |

(Continued)

OTHER PUBLICATIONS

U.S. Appl. No. 13/545,918, Corrected Notice of Allowability dated Jun. 8, 2016, 2 pages.
(Continued)

*Primary Examiner* — Allen C Wong
(74) *Attorney, Agent, or Firm* — Kilpatrick Townsend & Stockton LLP; Dean W. Russell

(57) ABSTRACT

A pool cleaning system for cleaning debris from a submerged surface of a swimming pool includes a self-propelled pool cleaner having rotatably-mounted supports for supporting and guiding the cleaner on the pool surface; an electric motor for enabling the rotation of the rotatably-mounted supports on the pool surface; at least one camera to capture imagery of the pool surface; a controller, in electronic communication with the at least one camera, to determine a cleanliness characteristic of the pool surface on which the cleaner has passed based on the camera imagery and generate a control signal to direct movement of the cleaner based on the cleanliness characteristic of the pool surface, and a portable electronic device configured to present a graphic on a display, the graphic depicting the
(Continued)

submerged surface of the pool and those portions of the surface that remain uncleaned as the cleaner traverses the pool surface.

3 Claims, 4 Drawing Sheets

Related U.S. Application Data continuation of application No. 15/973,983, filed on May 8, 2018, now Pat. No. 10,338,599, which is a continuation of application No. 15/207,065, filed on Jul. 11, 2016, now Pat. No. 9,995,051, which is a continuation of application No. 13/545,918, filed on Jul. 10, 2012, now Pat. No. 9,388,595.

(51) Int. Cl.
    *H04N 5/232*     (2006.01)
    *E04H 4/16*     (2006.01)
    *G05D 1/00*     (2006.01)
    *H04N 5/225*     (2006.01)
    *G06T 7/90*     (2017.01)
    *G06T 7/00*     (2017.01)

(52) U.S. Cl.
    CPC ......... *G05D 1/0033* (2013.01); *G05D 1/0038* (2013.01); *H04N 5/23203* (2013.01); *H04N 7/18* (2013.01); *G05D 2201/0203* (2013.01); *G06T 7/001* (2013.01); *G06T 7/90* (2017.01); *G06T 2207/10024* (2013.01); *H04N 2005/2255* (2013.01)

(58) Field of Classification Search
    CPC ................ H04N 7/18; H04N 5/23203; H04N 2005/2255; E04H 4/1654; G06T 7/001; G06T 7/90; G06T 2207/10024
    USPC ......................................................... 348/114
    See application file for complete search history.

(56) References Cited

U.S. PATENT DOCUMENTS

| | | | |
|---|---|---|---|
| 5,507,058 A | 4/1996 | Minami et al. | |
| 5,613,261 A | 3/1997 | Kawakami et al. | |
| 5,886,630 A | 3/1999 | Menoud | |
| 7,123,746 B2 | 10/2006 | Meniere et al. | |
| 7,362,351 B2* | 4/2008 | Meniere ................... | G01V 8/10 348/135 |
| 7,398,138 B2 | 7/2008 | Emery et al. | |
| 7,993,600 B2 | 8/2011 | Doyle et al. | |
| 8,007,653 B2 | 8/2011 | Porat | |
| 8,043,070 B2 | 10/2011 | Stiles, Jr. et al. | |
| 9,388,595 B2 | 7/2016 | Durvasula et al. | |
| 9,995,051 B2 | 6/2018 | Durvasula et al. | |
| 10,338,599 B2 | 7/2019 | Durvasula et al. | |
| 10,739,785 B2 | 8/2020 | Durvasula et al. | |
| 2002/0097322 A1 | 7/2002 | Monroe et al. | |
| 2004/0025268 A1 | 2/2004 | Porat et al. | |
| 2004/0040581 A1 | 3/2004 | Bruwer | |
| 2007/0094817 A1 | 5/2007 | Stoltz et al. | |
| 2010/0299016 A1 | 11/2010 | Benzler et al. | |
| 2011/0049023 A1* | 3/2011 | Hui ...................... | E04H 4/1654 210/91 |
| 2011/0091329 A1 | 4/2011 | Stiles, Jr. et al. | |
| 2011/0290707 A1* | 12/2011 | Porat .................... | C02F 1/4674 210/96.1 |
| 2011/0301752 A1 | 12/2011 | Finezilber | |
| 2013/0151061 A1 | 6/2013 | Hong et al. | |
| 2013/0152970 A1 | 6/2013 | Porat | |
| 2013/0269097 A1 | 10/2013 | Alammari | |
| 2014/0009748 A1 | 1/2014 | Leonessa et al. | |

FOREIGN PATENT DOCUMENTS

| | | | |
|---|---|---|---|
| EP | 0811432 | 12/1997 | |
| JP | 6162905 | 3/1986 | |
| WO | 2004019295 | 3/2004 | |
| WO | 2009031361 | 3/2009 | |
| WO | 2012023676 | 2/2012 | |
| WO | WO 2012023676 A1 * | 2/2012 | ............... E04H 4/16 |

OTHER PUBLICATIONS

U.S. Appl. No. 13/545,918, Non-Final Office Action dated Jun. 26, 2015, 17 pages.
U.S. Appl. No. 13/545,918 Notice of Allowability dated Mar. 9, 2016, 8 pages.
U.S. Appl. No. 13/545,918, Notice of Allowance dated Dec. 31, 2015, 8 pages.
U.S. Appl. No. 15/207,065, Non-Final Office Action dated Nov. 6, 2017, 10 pages.
U.S. Appl. No. 15/207,065, Notice of Allowance dated Feb. 23, 2018, 9 pages.
U.S. Appl. No. 15/973,983, Non-Final Office Action dated Nov. 6, 2018, 7 pages.
U.S. Appl. No. 15/973,983, Notice of Allowance dated Mar. 4, 2019, 9 pages.
U.S. Appl. No. 16/416,840, Non-Final Office Action dated Feb. 28, 2020, 7 pages.
U.S. Appl. No. 16/416,840, Non-Final Office Action dated Jan. 15, 2020, 9 pages.
U.S. Appl. No. 16/416,840, Notice of Allowability dated Jun. 30, 2020, 2 pages.
U.S. Appl. No. 16/416,840, Notice of Allowance dated Apr. 29, 2020, 9 pages.
Spanish Application No. ES2527883, Response to Substantive Examination dated May 5, 2016.
Spanish Application No. P201331047, Search Report dated Feb. 3, 2015, 1 page.

* cited by examiner

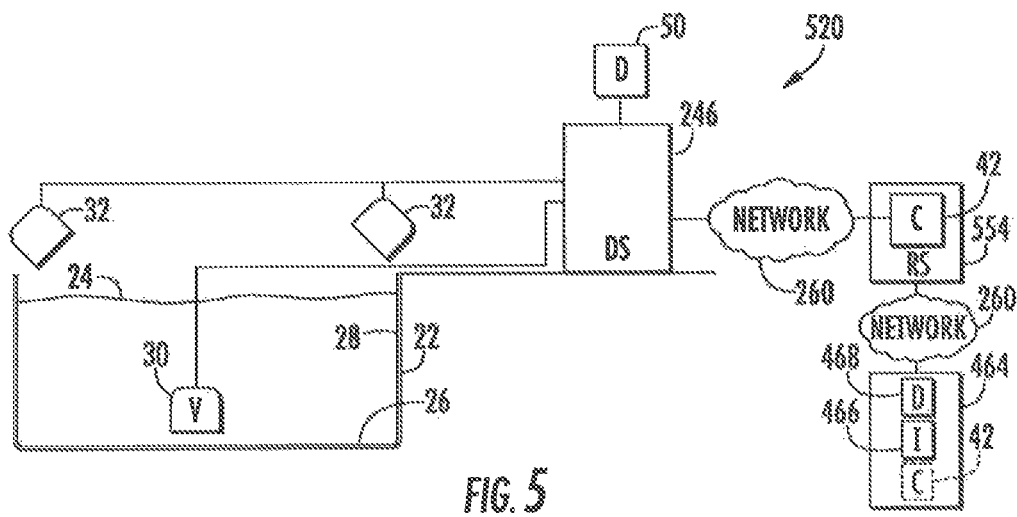
FIG. 5
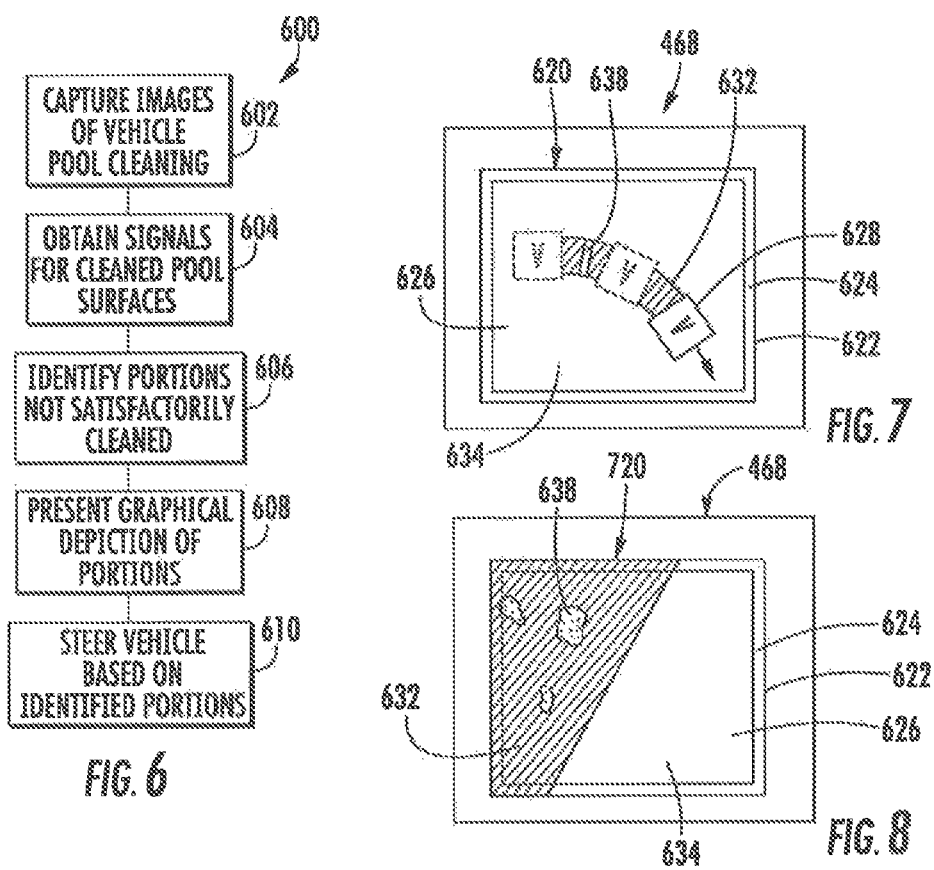
FIG. 6
FIG. 7
FIG. 8

POOL CLEANING SYSTEM AND METHOD TO AUTOMATICALLY CLEAN SURFACES OF A POOL USING IMAGES FROM A CAMERA

CROSS-REFERENCE TO RELATED APPLICATION

This application is a continuation of U.S. patent application Ser. No. 16/416,840, filed May 20, 2019 (now allowed), which is a continuation of U.S. patent application Ser. No. 15/973,983, filed May 8, 2018 (now U.S. Pat. No. 10,338,599), which is a continuation of U.S. patent application Ser. No. 15/207,065, filed Jul. 11, 2016 (now U.S. Pat. No. 9,995,051), which is a continuation of U.S. patent application Ser. No. 13/545,918, filed Jul. 10, 2012 (now U.S. Pat. No. 9,388,595), the contents of all of which are incorporated herein by reference in their entireties.

BACKGROUND

Manually cleaning the floor and sides of a swimming pool may be a tedious and time-consuming task. As a result, automated robotic pool cleaners have been developed. However, controlling and monitoring such automated robotic pool cleaners to insure that all portions of the pool surfaces are satisfactorily cleaned remains a challenge.

SUMMARY OF THE INVENTION

The disadvantages heretofore associated with the prior art are overcome by the present invention of a pool cleaning system for cleaning debris from a submerged surface of a swimming pool comprising: a self-propelled pool cleaner having rotatably-mounted supports for supporting and guiding the cleaner on the pool surface; a filter configured to retain the debris collected from the submerged surface of the swimming pool; an electric motor for enabling the rotation of the rotatably-mounted supports on the pool surface; at least one camera to capture imagery of the pool surface; a controller, in electronic communication with the at least one camera, to determine a cleanliness characteristic of the pool surface on which the cleaner has passed based on the camera imagery and generate a control signal to direct movement of the cleaner based on the cleanliness characteristic of the pool surface; and a portable electronic device is configured to present a graphic on a display, the graphic depicting the submerged surface of the pool and those portions of the surface that remain uncleaned as the cleaner traverses the pool surface.

In one aspect, the at least one camera is carried by the cleaner. In another aspect, the controller is carried by the cleaner. In still another aspect, the electric motor is mechanically connected to at least one of the rotatably-mounted supports.

In yet another aspect, the controller is operable to execute one or more cleaning programs for cleaning the submerged surfaces of the pool. In one aspect, the control signal causes the cleaner to drive in a direction to clean a portion of the pool surface based on the cleanliness characteristic of the pool surface. Alternatively, the control signal causes the cleaner to steer in a direction to clean a portion of the pool surface based on the cleanliness characteristic of the pool surface. In another aspect, the control signal causes the cleaner to drive in a direction to re-clean a portion of the pool surface over which the cleaner has passed. Alternatively, the control signal causes the cleaner to steer in a direction to re-clean a portion of the pool surface over which the cleaner has passed.

In one aspect, the captured imagery from the at least one camera is digitally processed by the controller to determine the cleanliness characteristic of the pool surface. Alternatively, the captured imagery from the at least one camera is digitally processed by a remote processor to determine the cleanliness characteristic of the pool surface.

In another aspect, the system further comprises a dry station located remotely from the cleaner and in communication with the cleaner, wherein the dry station includes the controller. Alternatively, the system further comprises a dry station located remotely from the cleaner and in communication with the cleaner, wherein the controller is located remotely from the cleaner and the dry station. In still another aspect, the controller controls electric power provided to the electric motor.

In one aspect, the control signal causes the cleaner to move in a direction of a portion of the pool surface to be cleaned based solely upon signals received from the camera. In another aspect, the control signal causes the cleaner to drive in a direction to clean a portion of the pool surface based on the cleanliness characteristic of the pool surface. Alternatively, the control signal causes the cleaner to steer in a direction to clean a portion of the pool surface based on the cleanliness characteristic of the pool surface. In yet another aspect, the control signal causes the cleaner to drive in a direction to re-clean a portion of the pool surface over which the cleaner has passed. Alternatively, the control signal causes the cleaner to steer in a direction to re-clean a portion of the pool surface over which the cleaner has passed.

BRIEF DESCRIPTION OF THE DRAWINGS

FIG. 5 is a schematic illustration of an implementation of the pool cleaning system of FIG. 1.

FIG. 6 is a flow diagram of an example method that may be carried out with the pool cleaning system of FIG. 2-5.

FIG. 7 is a plan view of an example display with an example graphical depiction.

FIG. 8 is a plan view of another example display with an example graphical depiction.

DETAILED DESCRIPTION OF THE EXAMPLE EMBODIMENTS

Figure 1:
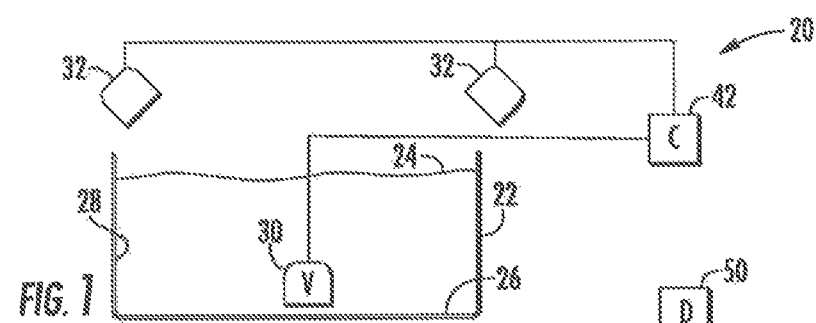
FIG. 1 is a schematic illustration of an example pool cleaning system.

FIG. 1 schematically illustrates an example pool cleaning system 20. As schematically shown by FIG. 1, pool cleaning system 20 is adapted to clean submerged surfaces of a pool 22 containing a liquid 24. In particular, pool cleaning system 20 is adapted to clean at least a bottom or floor surface 26 of the pool 22 and possibly to additionally clean surfaces 28 of pool 22. As will be described hereafter, pool cleaning system facilitates the control and monitoring of a robotic pool cleaner to better assure that all portions of pool 22 are satisfactorily cleaned.

Pool cleaning system 20 comprises vehicle 30, cameras 32 and controller 42. Vehicle 30 comprises an automated powered device configured to travel adjacent to submerged or water containing surfaces of pool 20 (such as floor 26 and/or side surfaces 28) while cleaning such surfaces. In one implementation, vehicle 30 may include vacuum or suction devices, a liquid circulation system and a filter to draw debris, such as bacterial growth or plant growth, from such pool surfaces, wherein the drawn liquid containing such residue or foreign matter is filtered to collect the debris. In other implementations, vehicle 30 may not collect such debris, wherein vehicle 30 merely loosens such debris on the pool surfaces such that the loosened or separated debris may be subsequently removed using the existing liquid filtering system of pool 22.

To assist in the loosening of debris, in one implementation, vehicle 30 may additionally include a chemical dispenser to closely apply pool cleaning chemicals to the pool surfaces as the vehicle 30 traverses such surfaces. In one implementation, vehicle 30 may additionally or alternatively include one or more scrubbing members, such as active (driven) or passive (undriven or idling) brushes, to assist in the removal of residue or foreign matter from such pool surfaces. In yet another implementation, vehicle 30 may additionally or alternatively include liquid jets to assist in the loosening of debris.

To move along the submerged surfaces of pool 22, vehicle 30 includes one or more propulsion mechanisms. In one implementation, vehicle 30 is propelled along the submerged pool surfaces using wheels, rollers, tracks or other surface contacting members powered by a motor and the like. Such wheels, rollers or tracks may themselves include the scrubbing members used to clean the surfaces. In one implementation vehicle 30 may also alternatively be propelled by means of the vacuum or liquid jets. The vacuum or liquid jets used for such propulsion nozzle facilitate loosening of debris for collection by vehicle 30. In other implementations, vehicle 30 may include other propulsion mechanisms.

Cameras 32 comprise devices configured to capture video or time lapse images of pool 22. In the example illustrated, cameras 32 are mounted on structures external to pool 22. In other words, cameras 32 are not submerged. In other implementations, cameras 32 may alternatively be mounted to vehicle 30. In the example illustrated, cameras 32 capture movement of vehicle 30 while vehicle 30 is submerged within pool 22. In other implementations, cameras 32 merely capture images of submerged surfaces 26, 28 of pool 22.

In the example illustrated, cameras 32 comprise cameras serving as part of a home or pool security system, wherein such cameras detect the presence of a person at pool 22 satisfying a predefined characteristic and wherein an alert is output upon the person's detected presence. For example, in one implementation, cameras 32 are utilized as part of a security system that detects when a person below a predefined age, such as a child, is present at pool 22 without a detected presence of a recognized adult. In another implementation, cameras 32 may detect the presence of an unauthorized person or intruder at pool 22. Identification of the person may be achieved by an off-site human or computerized monitoring system, wherein signals from cameras 32 are transmitted across a wide area network or may be achieved with software of controller 42 which includes facial recognition or other identification programming.

Because pool cleaning system 20 utilizes pre-existing cameras 32 provided as part of a security system or shares the use of cameras 32 with such a home or pool security system, pool cleaning system 20 is easier to set up, less complex and less expensive. In other implementations, pool cleaning system 20 may utilize dedicated cameras 22 independent of any cameras associated with a home, facility or pool security system. In such an alternative system, cameras 32 may be more precisely focused upon pool 22 and surfaces 26, 28 while also including appropriate lenses or modifications to account for glare, refraction and the like to better facilitate the capture of surfaces and vehicle 30 which are submerged.

Controller 42 comprises one or more processing units in communication with vehicle 30 and cameras 32. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 42 may be embodied as part of one or more application-specific integrated circuits (ASICs). Unless otherwise specifically noted, the controller is not limited to any specific combination of hardware circuitry and software, nor to any particular source for the instructions executed by the processing unit.

In one implementation, controller 42 communicates with vehicle 30 and cameras 32 entirely across a wired connection. In another implementation, controller 42 communicates with vehicle 30 and cameras 32 across a wireless connection, such as cross a local area network (LAN) or a wide area network (WAN) such as the Internet. One of limitation, controller 42 may communicate with vehicle 30 and cameras 32 using a combination of both wired and wireless communication connections.

Controller 42 is configured to generate control signals for steering vehicle 30 based upon signals received from cameras 32. In one implementation, controller 42 provides the sole steering directions for vehicle 30 using signals from cameras 32. Because vehicle 30 is precisely steered under the control of controller 42, rather than traveling in a random manner, entire summer surfaces of pool 22 may be more quickly and efficiently covered and cleaned. Because controller 42 provides the only steering instructions for vehicle 30 and utilizes signals from cameras 32, complex steering algorithms or codes in either vehicle 30 or controller 42 may be omitted to reduce complexity and cost of system 20.

In another implementation, vehicle 30 may cover or travel across surfaces of pool 22 in either a random fashion or according to an automated pool coverage algorithm or pool coverage pattern stored in a memory associated with vehicle 30 or controller 42. In such an implementation, controller 42 utilizes signals from cameras 32 to verify that all of the surfaces of pool 22 have been cleaned, that no spots have been missed. Upon identifying a missed spot, controller 42 utilizes signals from camera 32 to steer vehicle 32 over such missed portions of surfaces 26, 28. According to one example, controller 42 not only uses signals from camera 32 to determine whether any portions of surfaces 26, 28 have been missed entirely, but to also determine whether any portions of surfaces 26,28 have been cleaned, but not to a satisfactory degree or extent. In such circumstances, controller 42 uses signals from cameras 32 to steer vehicle 34 such areas to re-clean such portions until such portions have been satisfactorily cleaned such that the portions have a cleanliness characteristic satisfying a predefined threshold.

Figure 2:
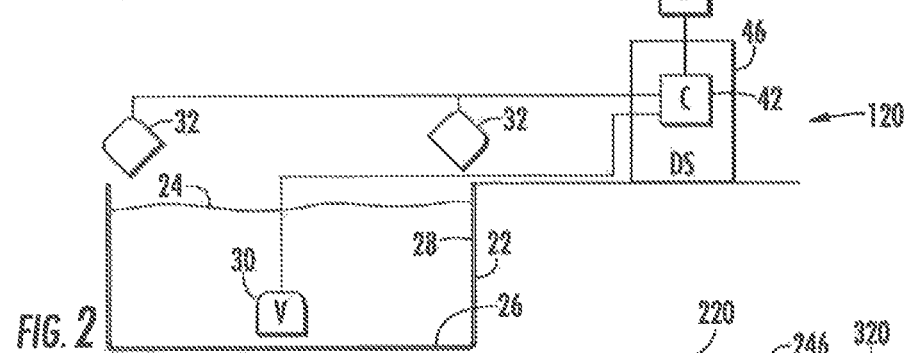
FIG. 2 is a schematic illustration of an implementation of the pool cleaning system of FIG. 1.

FIG. 2 schematically illustrates pool cleaning system 120, the particular example of pool cleaning system 20 described above. Pool cleaning system 120 is similar to pool cleaning system 20 except that pool cleaning system 120 additionally comprises dry station 46 and display 50. Those remaining components of pool cleaning system 120 which correspond to components of pool cleaning system 20 are numbered similarly.

Dry station 46 comprises a station in communication with vehicle 30 and cameras 32 outside of pool 22. Dry station 46 incorporates controller 42. In one implementation, dry station 46 communicates with vehicle 30 in a wired fashion. In such an implementation, dry station 46 further provides electrical power to vehicle 30 in a wired fashion. Dry station 46 communicates with cameras 32 and either a wired or wireless fashion.

Display 50 comprises a device to present a graphical images and text on a display screen. In one implementation, display 58 may be incorporated as part of dry station 46. In another implementation, display 50 may be provided on a portable electronic device, a computer, a television and the like. Display 50 is utilized by pool cleaning system 120 to present information regarding the cleaning of pool 22 to facilitate control of vehicle 30 by controller 42. In one implementation, display 50 is utilized by pool cleaning system 120 and a controller 42 to present a graphical depiction of those portions of surfaces 26, 28 of pool 22 have not been satisfactorily cleaned so as to satisfy a predefined cleanliness characteristic threshold. Such portions may comprise portions that have been completely missed by vehicle 30 as well as those portions that have been covered by vehicle 30 but have not been satisfactorily cleaned with the given number of passes of vehicle 30 or the existing cleaning settings of vehicle 30. The graphical depiction presented on display 50 enables a person view the quality of the prior cleaning session and to input commands causing controller 42 to generate control signals using signals from camera 32 to steer vehicle 30 back to such identified portions where such portions may be cleaned at the same or elevated cleaning aggressiveness settings.

Another implementation, display 50 may be further utilized by controller 42 to depict the progress of vehicle 30 in cleaning pool 22. Such a display 50 allows a person to visually determine how much of the pool has been currently cleaned and to estimate the remaining time before the pool cleaning task is completed. In certain circumstances, using display 50, a person may adjust a setting of vehicle 30 to accelerate a rate at which surfaces 26, 20 of pool 22 are cleaned to meet an earlier desired completion time for such pool cleaning.

Figure 3:
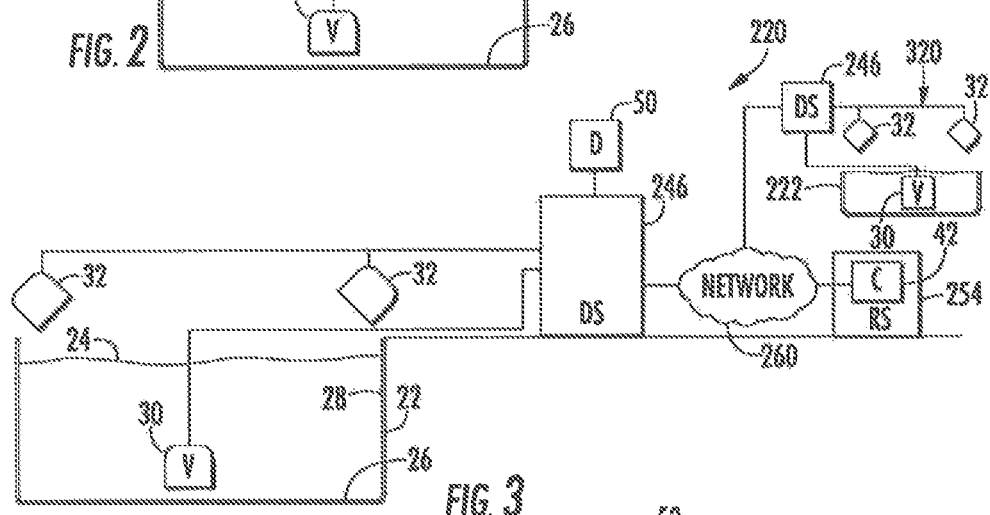
FIG. 3 is a schematic illustration of an implementation of the pool cleaning system of FIG. 1.

FIG. 3 schematically illustrates pool cleaning system 220, another example implementation of pool cleaning system 20. Pool cleaning system 220 is similar to pool cleaning system 20 except that pool cleaning system 220 additionally comprises dry station 246, display 50, and remote server 254. Those remaining components of pool cleaning system 220 which correspond to components of pool cleaning system 20 or pool cleaning system 120 are numbered similarly.

Dry station 246 is similar to dry station 46, described above, except that dry station 246 serves as a local interface for communication with controller 42 across a network 260. In one implementation, network 260 may comprise a local area network. In another implementation, network 260 may comprise a wide area network, such as the Internet. For example, in one implementation, dry station 246 may incorporate a modem. In one implementation, dry station 246 may communicate across a local area network to controller 42. In another implementation, dry station 246 may communicate through a router, across a local area network, to a local modem which communicates across a network 260. The example illustrated, dry station 246 further provides part of vehicle 30 across a wired cable or wired connection. Display 50 is described above with respect to system 120.

Remote server 254 comprises a server remote from dry station 246 which is in communication with dry station 246 across network 260. Remote server 254 includes controller 42. During operation, signals from cameras 32 are transmitted across dry station 246 across network 260 to controller 42 of remote server 254. Based upon such signals from cameras 32, controller 42 generates control signals which are transmitted back across network 260 and through dry station 246 to vehicle 30 to steer vehicle 30.

As shown by FIG. 3, remote server 254 and network 260 may be shared as part of other pool cleaning systems 320, wherein controller 42 generates control signals for steering the pool cleaning vehicle 30 of system 320 based upon signals from cameras 32 transmitted across dry station 246 of system 320. In such an implementation, the cost and complexity of pool cleaning system 220 is reduced since controller 42 is remotely provided at remote server 254 which services multiple pool cleaning systems 220,320. Upgrades to controller 42 and its software are also more easily achieved for all pool cleaning systems to 20, 320 and their pools 22, 222 being serviced. In one implementation, the supervised cleaning, inspection and possible re-cleaning facilitated by the use of cameras 32 may be provided as part of a subscription to users of vehicle 30. In such an implementation, a pool 22 having security cameras 32 may be upgraded with appropriate software or an appropriate software module added to dry station 246 to make a network connection with controller 42 which directs the security cameras 32 to capture vehicle 30 utilizes such signals for steering vehicle 30.

Figure 4:
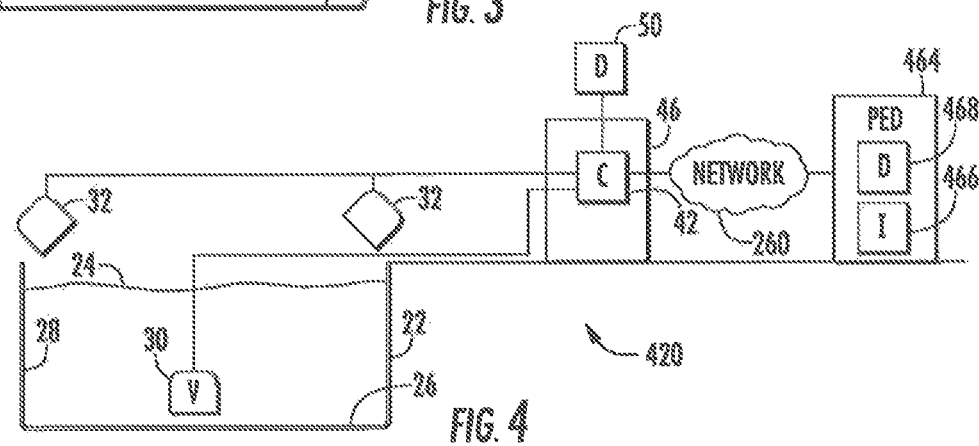
FIG. 4 is a schematic illustration of an implementation of the pool cleaning system of FIG. 1.

FIG. 4 schematically illustrates pool cleaning system 420, another particular implementation of pool cleaning system 20. Pool cleaning system 420 is similar to pool cleaning system 120 except that pool cleaning system 420 additionally comprises a portable electronic device 464. Those remaining components of pool cleaning system 420 which correspond to components of pool cleaning system 120 are numbered similarly.

Portable electronic device 464 comprises a portable handheld electronic device in communication with controller 42 and/or dry station 46 across network 260. Examples of such a portable electronic device (PED) 300 include, but are not limited to, a smart phone, a personal data assistant (PDA), laptop, notebook computer, tablet computer (e.g. IPAD) and MP3 player (e.g., IPOD TOUCH). In the example illustrated, PED 464 comprises input 466 and display 468.

Input 466 serves as a user interface for PED 464 by which inputs are made to PED 464. Input 466 facilitates entry of inputs or commands by a person to cause controller 42 to generate control signals varying the control of vehicle 30. In one implementation, input 466 comprise a keyboard in other implementations, input 466 may comprise a touchpad, a stylus, a microphone with associated speech recognition software or programming, a touch screen, buttons, switches and the like. In some implementations, input 466 may comprise a touch screen incorporated as part of display 468.

Display 468 comprises a user interface by which graphical or textual data is presented to a user. Display 468 may present the same or similar information as presented at dry station 246 by display 50 as described above. In one implementation, display 468 comprises a liquid crystal display. In other implementations, display 468 may comprise other types of display technology such as a light emitting diode display, an organic light emitting diode display (OLED), an electronic ink (e-ink) display or other types of display technology in present use or developed in the future. Although system 420 is illustrated as including controller 422 is part of dry station 46, in some implementations, controller 42 may alternatively be located as part of PED 464.

PED 464 enables a person located remote from pool 22 to monitor the progress of the cleaning of pool 22 by vehicle 30 of system 420. PED 464 provides a person with a graphical presentation (described above with respect to display 50) indicating those portions of surfaces 26, 28 of pool 22 that have been completed as well as those portions 26, 20 and that remain to be cleaned. The person may also be provided with a graphical indication of what portions need to be re-cleaned to meet predetermined cleanliness thresholds. In the example illustrated, input 466 enables a person to enter commands or selections which are transmitted across network 260 to controller 42 to adjust operation of vehicle 30. For example, the path or route of vehicle 30 may be changed, the aggressiveness of the cleaning chemicals or mechanical cleaning devices may be adjusted, the speed at which vehicle 30 traverses surfaces 26, 28 may be adjusted. In response to such adjustment signals from PED 464, controller 42 may utilize signals from cameras 32 to adjust the steering of vehicle 30.

FIG. 5 schematically illustrates pool cleaning system 520, another example implementation of pool cleaning system 20. Pool cleaning system 520 is similar to pool cleaning system 420 except that pool cleaning system 520 additionally comprises a remote server 554. Those remaining components of pool cleaning system 520 which correspond to components of pool cleaning system 420 are numbered similarly.

Remote server 554 is similar to remote server 254 described above with respect to system 220. Remote server 554 comprises a server remote from dry station 246 which is in communication with dry station 246 across network 260. Remote server 254 includes controller 42. During operation, signals from cameras 32 are transmitted across dry station 246 across network 260 to controller 42 of remote server 254. Based upon such signals from cameras 32, controller 42 generates control signals which are transmitted back across network 260 and through dry station 246 to vehicle 30 to steer vehicle 30. Controller 42 further relays either the raw signals from camera 32 or image signals generated based upon signals from cameras 32 to PED 464, wherein such images (described above) are presented on display 468. As noted above, PED may further receive commands through input 466, wherein such commands are transmitted to controller 42 which generates control signals that are ultimately transmitted to vehicle 30 for steering vehicle 30.

As with remote server 254, remote server 554 and network 260 may be shared as part of other pool cleaning systems 320 (shown in FIG. 3), wherein controller 42 generates control signals for steering the pool cleaning vehicle 30 of system 320 based upon signals from cameras 32 transmitted across dry station 246 of system 320. In such implementations, controller 42 of remote server 554 may interact with other PEDs 464. In such an implementation, the cost and complexity of pool cleaning system 220 is reduced since controller 42 is remotely provided at remote server 254 which services multiple pool cleaning systems 220, 320. Upgrades to controller 42 and its software are also more easily achieved for all pool cleaning systems to 20, 320 and their pools 22, 222 being serviced. In one implementation, the supervised cleaning, inspection and possible re-cleaning facilitated by the use of cameras 32 may be provided as part of a subscription to users of vehicle 30. In such an implementation, a pool 22 having security cameras 32 may be upgraded with appropriate software or an appropriate software module added to dry station 246 to make a network connection with controller 42 which directs the security cameras 32 to capture vehicle 30 utilizes such signals for steering vehicle 30. As indicated by broken lines, in other implementations, the controller 42 for generating control signals steering vehicle 30 based upon signals from cameras 32 may alternatively be relocated in PED 464.

FIG. 6 is a flow diagram illustrating an example method 600 that may be carried out by any of systems 120-520. As indicated by step 602, cameras 32 capture images of pool cleaning by vehicle 30. As indicated by step 604, controller 42 obtain such signals from cameras 32 for the surfaces of pool 22 that have been cleaned. As indicated by step 606, controller 42 uses information gathered from the signals from cameras 32 to identify those portions of surfaces 26, 28 not satisfactorily cleaned—not satisfying a predefined cleanliness characteristic or measurement threshold. One example of a cleanliness characteristic measurement a threshold may be how well the color of a surface matches a predetermined desirable color for the pool surface (such as original color of the tile or surface). A surface that has been missed entirely by vehicle 30 during a pool cleaning session may be automatically deemed to not satisfy a predetermined cleanliness characteristic.

As indicated by step 608, based upon such determinations, controller 42 generates control signals resulting in the presentation of a graphical depiction of those portions of pool 22 that has not been satisfactorily cleaned. Such graphical representations or depictions may be presented on display 50 or display 468. FIGS. 7 and 8 illustrate examples of graphical depictions that may be presented.

FIG. 7 illustrates display 468 presenting graphical depiction 620. Graphical depiction 620 comprises a first graphic 622 having a first portion 624 representing sides or walls 28 of pool 22 and a second portion 626 representing the floor 26 of pool 22. Graphical depiction 620 further comprises a moving icon 628 representing the current positioning of vehicle 30. In one implementation, the path of vehicle 30 may additionally be depicted by icon 628 shown in broken lines. As shown by FIG. 7, those portions 632 of surfaces 26, 28 of pool 22 (shown in FIG. 1) over which of vehicle 30 has moved are identified by graphical depiction 620 either by color, markings or other various distinctive attributes. Likewise, those portions 634 of surfaces 26, 28 of pool 22 that have not been covered by vehicle 30 are identified by a distinct color col marking or distinctive attribute of depiction 620. As a result, a person may view the current position of vehicle 30, the extent to which pool 22 has been cleaned or covered by vehicle 30 and the extent of pool 22 that remains to be cleaned. In the example illustrated, depiction 620 further identifies those portions 638 of surfaces 26, 28 that have been cleaned, but which have not been cleaned to a satisfactory degree or extent. In one implementation, portions 638 may be identified by colors, brightness, markings or other visually distinctive attributes that are visually distinct from both portions 632 and portions 634. In other implementations, portions 638 may have the same characteristic of portions 634. In yet other implementations, different portions 638 may have different visual attributes depending upon a degree to which such clean portions have failed to satisfy the predefined cleanliness characteristic threshold. In some implementations, different port 638 may have different visual attributes depending upon different cleaning strategies that may be recommended for the different portions 638. For example, controller 42 may determine and recommend a first cleaning strategy (a first chemical solution jetted at a first rate and scrubbed at a first rate) with respect to a first portion 638 and may recommend a second different cleaning strategy (a second chemical solution jetted at a second rate is about a second rate) with respect to a second portion 638, wherein the different cleaning strategies are represented by different visual attributes presented in depiction 620.

FIG. 8 illustrates display 468 presenting a graphical depiction 720. Graphical depiction 720 comprises a first graphic 622 having a first portion 624 representing sides or walls 28 of pool 22 and a second portion 626 representing the floor 26 of pool 22 (shown in FIG. 1). Graphical depiction 720 is similar to graphical depiction 620 except that graphical depiction 720 omits icon 628 presenting vehicle 30. Like depiction 620, depiction 720 graphically depicts those portions 632 of surfaces 26, 28 over which vehicle 30 has traveled while in a cleaning mode. Depiction 720 also visually depicts those portions 634 that have not been covered by vehicle 30 in the cleaning mode and those portions 638 over which vehicle 30 has traveled while in the cleaning mode, but which have not been cleaned to a satisfactory degree. As illustrated in FIG. 8, different portions 638 may be visibly distinguished from one another through color, text or markings indicating either differences in the cleanliness of such portions 638 or indicating different recommended cleaning strategies or approaches that may be selected by a person using input 466 when vehicle 30 is steered back to such portions 638 for re-cleaning using signals from camera 32.

As indicated by step 610 of FIG. 6, controller 42 generates control signals steering vehicle 30 to re-clean portions of pool 22, such as portions 638. Such steering may be facilitated by using signals from cameras 32. As noted above, in some implementations, a person may be allowed choose a cleaning approach for a particular portion 638 using input 466. The selection may be facilitated by visual inspection of the different visual attributes for the particular portion 638 provided by depiction 720 (or depiction 620). In some implementations, input 466 may additionally be utilized by a person to prioritize an order in which portions 638 are re-cleaned.

Figure 9:
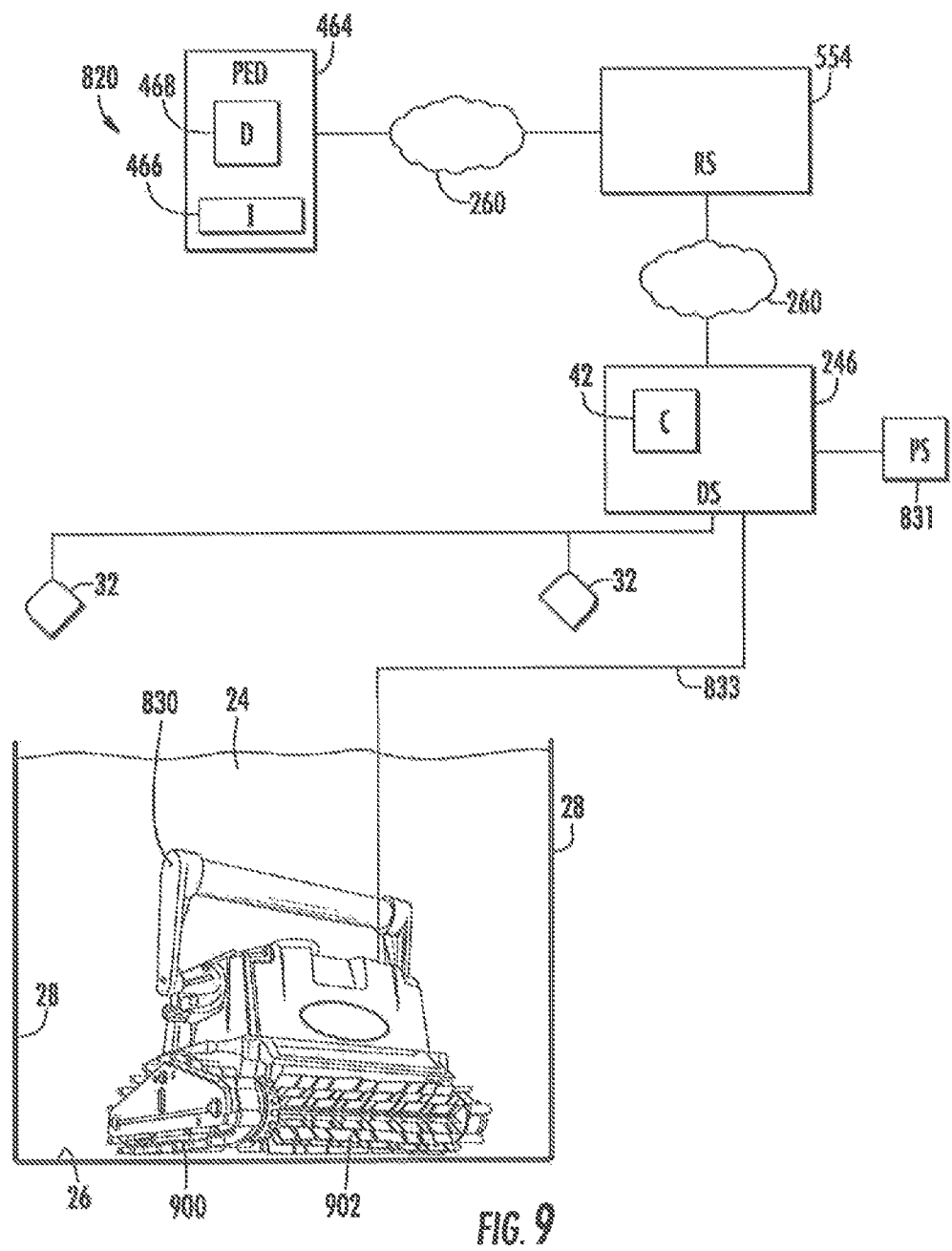
FIG. 9 is a schematic illustration of an implementation of the pool cleaning system of FIG. 1 with an example pool cleaning vehicle.

FIG. 9 illustrates pool cleaning system 820, an example implementation of pool cleaning system 20. Pool cleaning system 820 is similar to pool cleaning system 520 except the pool cleaning system 820 located controller 42 in dry station 246 and includes pool cleaning vehicle 830, a specific example of vehicle 30. As shown by FIG. 9, in addition to transmitting control signals generated by controller 42 to vehicle 830, dry station 246 further transmits power from power source 831 through a power line or power cable 833 to vehicle 830. In the example illustrated, data communication and communication of control signals, also occurs across wired connections within or alongside the same line 833. In the example illustrated, remote server 554 serves as a communication link by which upgrades to controller 42 may be implemented across a wide number of pool cleaning systems and by which information from controller 42 is conveyed to one or more portable electronic devices 464 across network 260.

Figure 10:
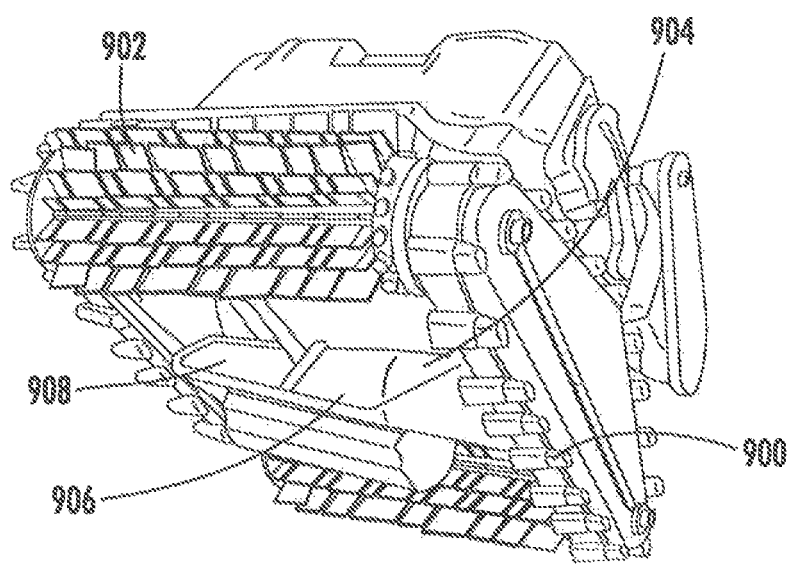
FIG. 10 is a bottom perspective view of the example pool cleaning vehicle of the system of FIG. 9.

Vehicle 830 comprises a robotic or automated pool cleaning device. Vehicle 830 comprises a self-contained onboard filtration system with drive and pump motors. Vehicle 830 utilizes an internal microprocessor guided drive motor to systematically clean surfaces of pool 22. As shown by FIGS. 9 and 10, vehicle 830 utilizes a toothed track drive 900 provide traction and propulsion for vehicle 30. Vehicle 830 comprises rotating brushes 902 to loosen waterline buildup and breakdown large debris while power washing jets 904 flush out dirt from pores, seems in corners where brushes 902 may not be able to reach. The loosened dirt and debris is vacuumed through off-center vacuum ports 906 which passes the vacuumed debris through internally house filter bag. In the example illustrated, vehicle 830 further comprises rollers 908 which inhibit vehicle 830 from becoming impeded or stuck on raised drains or pop-up heads. Although illustrated as being employed with system 820, vehicle 830 may also be utilized with any of systems 20, 120, 220, 320 and 420. In other implementations, other robotic or automated pool cleaning vehicles may be utilized.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A self-propelled pool cleaner for cleaning debris from a submerged surface of a swimming pool, comprising:
   a. a vehicle body;
   b. means for moving the vehicle body within the swimming pool;
   c. a filter configured to retain debris collected from the submerged surface;
   d. at least one camera positioned on or in the body for capturing an image of at least a first portion of the submerged surface; and
   e. a controller (i) positioned on or in the body, (ii) in electronic communication with the at least one camera, and (iii) configured to generate, in response to the captured image, at least one control signal to cause movement of the body within the swimming pool to, or away from, the first portion of the submerged surface.

2. A system for cleaning debris from a submerged surface of a swimming pool, comprising:

a. a self-propelled pool cleaner comprising:
   i. a vehicle body;
   ii. means for moving the vehicle body within the swimming pool;
   iii. at least one camera positioned on or in the body for capturing an image of at least a first portion of the submerged surface; and
   iv. a controller (i) positioned on or in the body, (ii) in electronic communication with the at least one camera, and (iii) configured to generate, in response to the captured image, at least one control signal to cause movement of the body within the swimming pool to, or away from, the first portion of the submerged surface; and
b. a filter configured to retain debris collected from the submerged surface by the self-propelled pool cleaner.

3. A system for cleaning debris from a submerged surface of a swimming pool, comprising:

a. a self-propelled pool cleaner comprising:
   i. a vehicle body;
   ii. means for moving the vehicle body within the swimming pool;
   iii. a filter configured to retain debris collected from the submerged surface; and
   iv. at least one camera positioned on or in the body for capturing an image of at least a first portion of the submerged surface; and
b. a controller (i) in electronic communication with the at least one camera and (ii) configured to generate, in response to the captured image, at least one control signal to cause movement of the body within the swimming pool to, or away from, the first portion of the submerged surface.

* * * * *